Patented May 28, 1946

2,401,099

UNITED STATES PATENT OFFICE 2,401,099

REACTION OF 1,3-DIENES WITH POLY-HALOGENATED ALKANES AND PRODUCTS THEREOF

Wesley Rasmus Peterson, Wilmington, Del., assignor to E. I. du Pont de Nemours & Company, Wilmington, Del., a corporation of Delaware No Drawing. Application April 10, 1942,
Serial No. 438,458

35 Claims. (Cl. 260—654)

This invention relates to the reaction of butadiene with polyhalogen alkanes having a plurality of halogen atoms on one carbon atom and particularly to the products obtained therefrom.

It is well known that increased yields of linear high molecular weight polymers possessing improved properties can be obtained by polymerizing 1,3-butadiene in the presence of compounds having two or more chlorine atoms on the same carbon atom. These products are plastic, rubber-like materials, some of which possess valuable properties characteristic of soft rubber, whereas others are especially suitable as hard rubber and gutta percha substitutes.

It is an object of this invention to provide a method for preparing new, low molecular weight reaction products of 1,3-dienes with polyhalogenated alkanes. Another object is to prepare new chemical compounds. Other objects will appear hereinafter.

These objects have been accomplished by the discovery that, by the use of suitable catalysts and other reaction conditions, 1,3-dienes and their adducts or precursors, the 2,5-dihydrothiophene-1-dioxides, can be reacted with polyhalogenated alkanes of less than three carbon atoms having at least two halogen atoms attached to one carbon atom (halogenated derivatives of methane and ethane).

This invention provides a process for reacting a polyhalogen alkane of one or two carbon atoms having a plurality of halogen atoms on one carbon atom with a conjugated aliphatic 1,3-diene to obtain terminally halogen substituted alkenes containing one or two diene units in accordance with the detailed description below.

In carrying out the reaction of a polyhalogen alkane with a conjugated aliphatic 1,3-diene, it is preferred to operate at superatmospheric pressure. A suitable apparatus consists of a pressure reactor, preferably stainless steel, capable of being heated and equipped with a means of agitating the reactants, a means of determining the internal temperature of the vessel, and a valve or vent for relieving the pressure developed, if any, in the reaction vessel when the reaction is complete. It is generally preferable, but not necessary, to employ a substituted or unsubstituted 2,5-dihydrothiophene-1-dioxide as a source of the 1,3-diene, thus preparing the substituted or unsubstituted butadiene in situ. Accordingly, the reaction vessel is charged with a polyhalogen alkane, such as, for example, carbon tetrachloride, preferably freshly distilled, 2,5-dihydrothiophene-1-dioxide, the catalyst, which is preferably a diacyl peroxide or an ammonium or alkali metal persulfate, a polyhydroxy benzene such as pyrogallol, and a solvent for the polyhydroxy benzene such as ethanol. The reactor is then closed and the reaction mixture is heated to, and maintained at, the desired temperature, which is 90–150° C. while agitating the reaction vessel until the reaction is complete which is usually 4–6 hours. When this point is reached, the reaction mixture is allowed to cool, the by-product gas which is sulfur dioxide if a 2,5-dihydrothiophene-1-dioxide were employed is bled from the reactor, and the reaction mixture worked up to isolate the resulting product. Generally, the polyhalogen alkane is used in excess and a large portion of it remains unreacted at the end of the reactions. In order to separate the desired reaction products from the small amount of by-products formed, the reaction mixture is generally subjected to exhaustive steam distillation, the major portion of the reaction product being collected in the distillate. The principal constituents in the steam volatile portion may then be separated by fractional distillation into pure organic compounds. Other methods of purification of the reaction mixture, such as extraction, recrystallization, and sublimation or combinations thereof, which are well known to the art, may be employed to separate the crude reaction mixture into the individual compounds present. In a number of applications, it may be preferable to employ the crude reaction mixture without purification.

The method of operation, as described above, is the preferred one; however, the reaction has been found to proceed providing certain other conditions are met. Thus, any iron-containing reaction vessel may be employed instead of the described stainless steel reactor or, if desired, a glass or silver-lined pressure vessel may be used provided small amounts of iron or iron-containing alloys or compounds are added to the reaction mixture. The addition of either the acyl peroxide or the polyhydroxy benzene may be omitted, but yields of the terminally halogen-substituted alkene are greatly reduced. The use of freshly purified polyhalogen alkane, although preferable, is not essential provided a polyhydroxy benzene is added to the reaction mixture. The interdependence of the various reaction conditions will be more fully described in the illustrative examples.

The raw materials or their precursors used in the operation of this invention are readily available in commerce. Mention should, however, be made of the method employed in the preparation of the diene-sulfur dioxide adducts, the substituted or unsubstituted 2,5-dihydrothiophene-1-dioxides. These materials were prepared by reacting the desired 1,3-diene with sulfur dioxide in the presence of a polyhydroxy benzene such as pyrogallol according to the method of Staudinger and Ritzenthaler (Ber. 68B, 455–71 (1935)).

In order that the process may be more fully understood, the following specific examples are given by way of illustration, but the invention is not limited thereto as will become more apparent hereinafter. Parts are given by weight.

Example I

A steel pressure reaction vessel is charged with 59 parts of 2,5-dihydrothiophene-1-dioxide, 76 parts of freshly distilled carbon tetrachloride and 0.5 part of benzoyl peroxide. The reactor is then heated for 8 hours at 90° C. during which time the reaction vessel is agitated. The reactor is cooled, the pressure, due to formation of sulfur dioxide, is released, and the product is transferred to a steam distillation apparatus. Steam distillation serves to remove the unreacted carbon tetrachloride and the low molecular weight reaction products from unreacted 2,5-dihydrothiophene-1-dioxide and non-volatile by-products. Upon distillation of the steam-volatile water-insoluble fraction, 19 parts (corresponding to 19 per cent of the theory) of a product having the following physical constants was obtained: B. P. 129–130° C./60 mm.; $d_4^{25}$, 1.3778; $n_D^{25}$, 1.5068. Analysis: Calculated for $C_5H_6Cl_4$ (tetrachloropentene) Cl, 68.3; molecular weight, 208; $M_D$, 44.27. Found: Cl, 68.40; molecular weight, 192, 189; $M_D$, 44.85.

The structure of the tetrachloropentene was established by oxidation with potassium permanganate at room temperature, followed by acidification of the resulting alkaline solution with hydrochloric acid, extraction of the organic portion from the aqueous solution with ether and distillation. A fraction boiling at 80° C./8 mm. which solidified on cooling was obtained. After recrystallization from benzene, the product melted at 60° C. and was identified as monochloroacetic acid by mixed melting point determination with an authentic sample. The structure of the tetrachloropentene was, therefore, shown to be 1,1,1,5-tetrachloropentene-3 as this is the only compound of the three possible isomers which would, upon oxidation, give monochloroacetic acid.

The beneficial effects of the use of freshly distilled carbon tetrachloride may best be emphasized by the fact that, in a large number of runs in which redistilled (not freshly) carbon tetrachloride was used in accordance with the details described in Example I, no reaction occurred, whereas, when the carbon tetrachloride was freshly distilled, yields of 1,1,1,5-tetrachloropentene-3, comparable to that described above, were consistently obtained.

Example II

The yields of 1,1,1,5-tetrachloropentene-3 are materially increased by including, in the reaction mixture, small amounts of a polyhydroxy benzene such as pyrogallol.

One hundred seventy-seven (177) parts of 2,5-dihydrothiophene-1-dioxide, 924 parts of freshly distilled carbon tetrachloride, 3 parts of benzoyl peroxide, 1 part of pyrogallol, and 8 parts of ethanol (as solvent for the pyrogallol) were charged into a stainless steel pressure reactor and the mixture heated for 6 hours at 110° C. The reaction vessel was cooled and the pressure reduced to atmospheric. The reaction product, after removal of the dissolved sulfur dioxide by gentle heating, was exhaustively steam distilled. After removal of the excess carbon tetrachloride by distillation of the steam-volatile water-insoluble fraction, 228 parts of reaction product was obtained. Upon distillation, 186 parts (62 per cent of the theory) of 1,1,1,5-tetrachloropentene-3 and 23 parts of a higher boiling fraction were obtained. Upon distillation of the accumulated distillation residues from a number of runs, a higher boiling fraction having the following physical constants was obtained: B. P. 99–101° C./1 mm.; $d_4^{25}$, 1.2556; $n_D^{25}$, 1.5083. Analysis: Calculated for $C_9H_{12}Cl_4$ (tetrachlorononadiene): Cl, 54.2, $M_D$, 62.28. Found: Cl, 55.53, 55.22; $M_D$, 62.2.

Example III

Another beneficial effect of the addition of pyrogallol to the reaction mixture is illustrated by the following run. Whereas no reaction occurred in the absence of pyrogallol when redistilled (not freshly) carbon tetrachloride was used, good yields of 1,1,1,5-tetrachloropentene-3 were obtained when pyrogallol was added to the reaction mixture.

One hundred seventy-seven (177) parts of 2,5-dihydrothiophene-1-dioxide, 924 parts of commercial (not freshly distilled) carbon tetrachloride, 3 parts of benzoyl peroxide, 1 part of pyrogallol, and 8 parts of ethanol were charged into a stainless steel pressure reactor and the reaction mixture heated for 4 hours at 110° C. After the reaction vessel was cooled and the pressure reduced to atmospheric, the reaction product was transferred to a steam distillation apparatus and exhaustively steam distilled. Upon distillation of the steam-volatile fraction, 159 parts (53 per cent of the theory) of 1,1,1,5-tetrachloropentene-3 and 13 parts of higher boiling product (principally tetrachlorononadiene) were obtained.

Example IV

Whereas the run described in Example I illustrates the preparation of 1,1,1,5-tetrachloropentene-3 from 2,5-dihydrothiophene-1-dioxide and carbon tetrachloride, in the presence of benzoyl peroxide without the addition of pyrogallol, the run described below illustrates its preparation in the presence of pyrogallol, but in the absence of benzoyl peroxide.

One hundred seventy-seven (177) parts of 2,5-dihydrothiophene-1-dioxide, 924 parts of freshly distilled carbon tetrachloride, 8 parts of ethanol, and 1 part of pyrogallol were charged into a stainless steel pressure reactor and the reaction mixture heated for 4 hours at 110° C. After the reaction vessel was cooled and the pressure reduced to atmospheric, the reaction product was transferred to a steam distillation apparatus and exhaustively steam distilled. Upon distillation of the steam-volatile fraction, 62 parts (21 percent of the theory) of 1,1,1,5-tetrachloropentene-3 and 50 parts of higher boiling product, primarily tetracholoronondiene, were obtained.

Example V

The runs described in the foregoing examples were all carried out in stainless steel or iron reaction vessels. In a run in which a silver-lined reactor was used, no 1,1,1,5-tetrachloropentene-3 was obtained when 2,5-dihydrothiophene-1-dioxide was reacted with carbon tetrachloride in accordance with the method described in Example II. However, in duplicate runs in which either a small amount of stainless steel or iron powder was added to the reaction mixture, yields of 1,1,1,5-tetrachloropentene-3 comparable to those obtained in the experiment described in Example II were obtained.

Fifty-nine (59) parts of 2,5-dihydrothiophene-1-dioxide, 308 parts of freshly distilled carbon tetrachloride, 8 parts of ethanol, 1 part of benzoyl peroxide 0.5 part of pyrogallol and 0.5 part of iron filings were charged into a silver-lined pressure reactor and the reaction mixture heated for 4 hours at 110° C. After the reaction vessel was cooled and the pressure reduced to atmospheric, the reaction product was transferred to a steam distillation apparatus and subjected to exhaustive steam distillation. Upon distillation of the steam-volatile fraction, 55 parts (55 per cent of the theory) of 1,1,1,5-tetrachloropentene-3 was obtained. In a duplicate experiment in which the iron filings were replaced with pieces of scrap stainless steel, a 62 per cent yield of 1,1,1,5-tetrachloropentene-3 was obtained. In another run in which the iron filings were replaced with a small amount of ferric chloride, an 18 per cent yield of 1,1,1,5-tetrachloropentene-3 was obtained.

Example VI

The preparation of 1,1,1,5-tetrachloropentene-3 at temperatures higher than those used in the examples described above may be illustrated by the following runs.

One hundred seventy-seven (177) parts of 2,5-dihydrothiophene-1-dioxide, 924 parts of freshly distilled carbon tetrachloride, 3 parts of benzoyl peroxide, 8 parts of ethanol and 1 part of pyrogallol were charged into a stainless steel pressure reactor and the reaction mixture heated for 4 hours at 130° C. After the reaction vessel was cooled and the pressure reduced to atmospheric, the reaction product was transferred to a steam distillation apparatus and exhaustively steam distilled. Upon distillation of the steam-volatile fraction, 172 parts (57 per cent of the theory) of 1,1,1,5-tetrachloropentene-3 along with 20 parts of higher boiling material was obtained. In a duplicate run in which the reaction mixture was heated for 4 hours at 150° C., 108 parts (36 per cent of the theory) of 1,1,1,5-tetrachloropentene-3 and 25 parts of higher boiling product were obtained.

Example VII

The runs described in the preceding examples illustrate the preparation of 1,1,1,5-tetrachloropentene-3 by reacting 2,5-dihydrothiophene-1-dioxide (i. e., 1,3-butadiene prepared in situ) with carbon tetrachloride. The following run describes the preparation of 1,1,1,5-tetrachloropentene-3 directly from 1,3-butadiene and carbon tetrachloride.

Eighty-one (81) parts of 1,3-butadiene, 924 parts of freshly distilled carbon tetrachloride, 8 parts of ethanol, 3 parts of benzoyl peroxide, and 1 part of pyrogallol were charged into a stainless steel pressure reactor and the reaction mixture heated for 4 hours at 110° C. After the reaction mixture was cooled and the pressure reduced to atmospheric, the reaction product was transferred to a steam distillation apparatus and subjected to exhaustive steam distillation. Upon distillation of the steam volatile fraction, 69 parts (23 per cent of the theory) of 1,1,1,5-tetrachloropentene-3 were obtained.

The reaction of polyhalogenated alkanes having a plurality of halogen atoms on one carbon atom with conjugated aliphatic 1,3-dienes is capable of producing a wide variety of products. The term polyhalogenated alkanes of less than three carbon atoms having a plurality of halogen atoms on one carbon atom includes commercially available or easily preparable materials such as carbon tetrachloride, chloroform, methylene chloride, carbon tetrabromide, bromoform, methylene bromide, iodoform, methylene iodide, methylene chloroiodide, hexachloroethane, 1,1,1-trichloroethane, and 1,1-dichloroethane.

Aliphatic 1,3-dienes, including commercially important materials such as 1,3-butadiene; 2-chloro-1,3-butadiene; 2-methyl-1,3-butadiene; 2-cyano-1,3-butadiene; and 2,3-dimethyl-1,3-butadiene can be used in the present invention. The corresponding 2,5-dihydrothiophene-1-dioxides prepared by reacting the said 1,3-dienes with sulfur dioxides are preferred to the 1,3-dienes because they give higher yields.

Suitable catalysts for the reaction include peroxygen compounds such as (1) the acyl peroxides such as acetyl peroxide, propionyl peroxide, lauroyl peroxide, and benzoyl peroxide, (2) the alkali metal and ammonium persulfates, perborates, and percarbonates and (3) other peroxides such as hydrogen peroxide, diethyl peroxide, cyclohexanone peroxide, tetrahydronaphthalene peroxide, and ascaridole.

Polyhydroxy benzenes other than pyrogallol may be added to the reaction mixture with equally good results. These include hydroquinone, resorcinol, and catechol.

The reaction of polyhalogenated alkanes with conjugated aliphatic dienes or their sulfur dioxide adducts, the substituted or unsubstituted 2,5-dihydrothiophene-1-dioxides, may be carried out over a wide range of temperature. In fact, the upper temperature limit is determined only by the thermal stability of the substituted pentenes or nonadienes obtained. The preferred temperature for any given reactants depends primarily on the haloalkane and the catalyst employed. The preferred reaction temperature for the majority of cases lies in the range 60–150° C. The preferred catalysts, such as the diacyl peroxides and the alkali or ammonium persulfates operate satisfactorily with most haloalkanes in this temperature range. Higher temperatures are generally employed only with less active haloalkanes when temperatures as high as 250° C. may be desirable.

In general, a molecular excess of the haloalkanes over the 1,3-diene is employed. In some instances, molar ratios of haloalkane to 1,3-diene or the 2,5-dihydrothiophene-1-dioxide as high as 10:1 are desirable, whereas with the more active haloalkane a 1:1 ratio is satisfactory.

Inert solvents can be substituted, sometimes to advantage if a higher ratio of higher molecular weight products is desired, for a large portion of the haloalkane and it is particularly desirable to do so when the haloalkane employed is a high melting crystalline solid such as hexachloroethane. As suitable solvents, the relatively low-boiling liquids which are inert under the reaction conditions are preferred. Among such materials may be mentioned the saturated aliphatic hydrocarbons, cycloaliphatic hydrocarbons, aliphatic ethers, cycloaliphatic ethers such as 1,4-dioxane, water, the low molecular weight alcohols, ketones and aromatic hydrocarbons.

The presence of atmospheric oxygen in small quantities in the reaction mixture in many instances has no deleterious effect. In other cases, it is desirable to evacuate or purge the reaction vessel with an oxygen-free gas such as nitrogen to reduce the oxygen content of the system to a minimum. The presence of large quantities of oxygen in the reaction system, such as may be obtained by evacuating the vessel and pressuring with oxygen, is to be avoided as in many cases the reaction is completely inhibited or the yield of product is very greatly reduced.

The reaction may be carried out in any pressure equipment made of materials capable of withstanding moderate corrosive attack. Such vessel may be constructed of stainless steel or any other type of steel in which the corrosive action of the reaction mixture is not excessive. Reaction vessels having an innerlining of silver, aluminum or glass may be employed, but, in these cases, small amounts of iron or iron-containing alloys or compounds must be added to the reaction mixture. In fact, any corrosive-resistant alloy or material may be employed if the above condition is met.

It is apparent from the wide variety of products obtainable in the practice of this invention that there is a large number of uses for which these materials may be employed. The lower molecular weight products such as those obtained when carbon tetrachloride or chloroform are used as the haloalkane may be used as solvents for a large variety of materials, whereas those having higher boiling points, such as those obtained when hexachloroethane is used as the haloalkane, may be used as plasticizers and softeners for cellulose derivatives and resinous materials without previous purification. The purified materials having active halogen atoms may be employed as intermediates in the synthesis of a large number of valuable derivatives.

It is apparent that many widely different embodiments of this invention may be made without departing from the spirit and scope thereof, and, therefore, it is not intended to be limited except as indicated in the appended claims.

I claim:

1. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated alkane of less than 3 carbon atoms having at least 2 halogen atoms attached to 1 carbon atom, in the presence of a polyhydroxy benzene, a peroxygen compound, and iron.

2. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated methane, in the presence of a polyhydroxy benzene, a peroxygen compound, and iron.

3. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated alkane of less than 3 carbon atoms having at least 2 halogen atoms attached to 1 carbon atom, in the presence of a peroxygen compound and iron.

4. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated methane, in the presence of a peroxygen compound and iron.

5. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated alkane of less than 3 carbon atoms having at least 2 halogen atoms attached to 1 carbon atom, in the presence of a polyhydroxy benzene and iron.

6. A process for the preparation of terminally halogen substituted alkenes containing from one to two units of a diene which comprises bringing a member of the group consisting of aliphatic 1,3-dienes and sulfur dioxide adducts thereof in contact with at least its molecular equivalent of a polyhalogenated methane, in the presence of a polyhydroxy benzene and iron.

7. A process which comprises reacting an aliphatic 1,3-diene with at least its molecular equivalent of a polyhalogenated alkane of less than three carbon atoms having at least two halogen atoms attached to one carbon atom in the presence of a polyhydroxy benzene, a peroxygen compound, and iron.

8. A process which comprises reacting an aliphatic 1,3-diene with at least its molecular equivalent of a polyhalogenated methane in the presence of a polyhydroxy benzene, a peroxygen compound, and iron.

9. A process which comprises reacting an aliphatic 1,3-diene with at least its molecular equivalent of a polychlorinated methane in the presence of a polyhydroxy benzene, a peroxygen compound, and iron.

10. A process which comprises reacting an aliphatic 1,3-diene with at least its molecular equivalent of a polyhalogenated alkane of less than three carbon atoms having at least two halogen atoms attached to one carbon atom in the presence of a peroxygen compound and iron.

11. A process which comprises reacting an aliphatic 1,3-diene with at least its molecular equivalent of a polyhalogenated methane in the presence of a peroxygen compound and iron.

12. A process which comprises reacting an aliphatic 1,3-diene with at least its molecular equivalent of a polychlorinated methane in the presence of a peroxygen compound and iron.

13. A process which comprises reacting an aliphatic 1,3-diene with at least its molecular equivalent of a polyhalogenated alkane of less than three carbon atoms having at least two halogen atoms attached to one carbon atom in the presence of a polyhydroxy benzene and iron.

14. A process which comprises reacting an aliphatic 1,3-diene with at least its molecular equivalent of a polyhalogenated methane in the presence of a polyhydroxy benzene and iron.

15. A process which comprises reacting an aliphatic 1,3-diene with at least its molecular equivalent of a polychlorinated methane in the presence of a polyhydroxy benzene and iron.

16. A process for the preparation of terminally halogen substituted alkenes containing from one to two units of a diene which comprises bringing 2,5-dihydrothiophene-1-dioxide in contact with at least its molecular equivalent of a polyhalogenated methane, in the presence of a polyhydroxy benzene, a peroxygen compound, and iron.

17. A process for the preparation of terminally halogen substituted alkenes containing from one to two units of a diene which comprises bringing 2,5-dihydrothiophene-1-dioxide in contact with at least its molecular equivalent of carbon tetrachloride, in the presence of a polyhydroxy benzene, iron, and a catalyst of the group consisting of diacyl peroxides, alkali persulfates, and ammonium persulfates.

18. A process for the preparation of terminally halogen substituted alkenes containing from one to two units of a diene which comprises bringing 2,5-dihydrothiophene-1-dioxide in contact with at least its molecular equivalent of carbon tetrachloride in the presence of pyrogallol, benzoyl peroxide, and iron.

19. A process for the preparation of terminally halogen substituted alkenes containing from one to two units of a diene which comprises bringing 2,5-dihydrothiophene-1-dioxide in contact with at least its molecular equivalent of freshly distilled carbon tetrachloride in the presence of pyrogallol, benzoyl peroxide, and iron, and at a temperature between 60° C. and 150° C., and at superatmospheric pressure.

20. A process for the preparation of terminally halogen substituted alkenes containing from one to two units of a diene which comprises bringing 2,5-dihydrothiophene-1-dioxide in contact with at least its molecular equivalent of carbon tetrachloride in the presence of a polyhydroxy benzene and iron.

21. A process for the preparation of terminally halogen substituted alkenes containing from one to two units of a diene which comprises bringing 2,5-dihydrothiophene-1-dioxide in contact with at least its molecular equivalent of freshly distilled carbon tetrachloride in the presence of pyrogallol and iron.

22. A process for the preparation of terminally halogen substituted alkenes containing from one to two units of a diene which comprises bringing 2,5-dihydrothiophene-1-dioxide in contact with at least its molecular equivalent of carbon tetrachloride in the presence of pyrogallol and iron, and at a temperature of between 60° C. and 150° C. and at superatmospheric pressure.

23. A process for the preparation of terminally halogen substituted alkenes containing from one to two units of a diene which comprises bringing 2,5-dihydrothiophene-1-dioxide in contact with at least its molecular equivalent of freshly distilled carbon tetrachloride in the presence of a catalyst of the group consisting of diacyl peroxides, alkali persulfates, and ammonium persulfate, and in the presence of iron.

24. A process for the preparation of terminally halogen substituted alkenes containing from one to two units of a diene which comprises bringing 2,5-dihydrothiophene-1-dioxide in contact with at least its molecular equivalent of freshly distilled carbon tetrachloride in the presence of benzoyl peroxide and iron, and at a temperature of between 60° C. and 150° C., and at superatmospheric pressure.

25. A process which comprises reacting 1,3-butadiene with at least its molecular equivalent of a polyhalogenated methane, in the presence of a polyhydroxy benzene, a peroxygen compound, and iron, the 1,3-butadiene being formed in situ from 2,5-dihydrothiophene-1-dioxide.

26. A process which comprises reacting 1,3-butadiene with at least its molecular equivalent of a polyhalogenated methane, in the presence of a polyhydroxy benzene, a peroxygen compound, and iron.

27. A process which comprises reacting 1,3-butadiene with at least its molecular equivalent of carbon tetrachloride, in the presence of a polyhydroxy benzene, iron, and a catalyst of the group consisting of diacyl peroxides, alkali persulfates, and ammonium persulfate.

28. A process which comprises reacting 1,3-butadiene with at least its molecular equivalent of carbon tetrachloride in the presence of pyrogallol, benzoyl peroxide, and iron.

29. A process which comprises reacting 1,3-butadiene with at least its molecular equivalent of freshly distilled carbon tetrachloride in the presence of pyrogallol, benzoyl peroxide, and iron, and at a temperature between 60° C. and 150° C., and at superatmospheric pressure.

30. A compound of the formula $$Y-(CH_2-CH=CH-CH_2)_n-CCl_3$$

wherein Y is a member of the group consisting of hydrogen and halogen, and $n$ is an integer less than three.

31. A compound of the formula $$Y-(CH_2-CH=CH-CH_2)-CCl_3$$

wherein Y is a member of the group consisting of halogen and hydrogen.

32. A compound of the formula $$Y-(CH_2-CH=CH-CH_2)_2-CCl_3$$

wherein Y is a member of the group consisting of halogen and hydrogen.

33. A compound of the formula $$Cl-(CH_2-CH=CH-CH_2)_n-CCl_3$$

wherein $n$ is an integer less than three.

34. A compound of the formula $$Cl-(CH_2-CH=CH-CH_2)-CCl_3$$

35. A compound of the formula
$$Cl-(CH_2-CH=CH-CH_2)_2-CCl_3$$

WESLEY RASMUS PETERSON.